United States Patent
Hu et al.

(10) Patent No.: US 12,101,291 B2
(45) Date of Patent: Sep. 24, 2024

(54) PROGRAMMABLE SWITCH-BASED METHOD FOR PROVIDING DOMAIN NAME SYSTEM SERVICE

(71) Applicant: Dell Products L.P., Round Rock, TX (US)

(72) Inventors: Chenxi Hu, Beijing (CN); Sanping Li, Beijing (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/114,725

(22) Filed: Feb. 27, 2023

(65) Prior Publication Data
US 2024/0250930 A1    Jul. 25, 2024

(30) Foreign Application Priority Data
Jan. 20, 2023 (CN) .......................... 202310079515.4

(51) Int. Cl.
*H04L 61/4511*    (2022.01)
*H04L 61/59*    (2022.01)

(52) U.S. Cl.
CPC .......... *H04L 61/4511* (2022.05); *H04L 61/59* (2022.05)

(58) Field of Classification Search
CPC ............................. H04L 61/4511; H04L 61/59
See application file for complete search history.

(56) References Cited

U.S. PATENT DOCUMENTS

| | | | |
|---|---|---|---|
| 10,511,498 B1 * | 12/2019 | Narayan | H04L 43/04 |
| 10,936,488 B1 * | 3/2021 | Earle | G06F 11/0754 |
| 11,128,597 B1 * | 9/2021 | Johnson | H04L 61/4511 |
| 11,658,995 B1 * | 5/2023 | Arora | H04L 63/20 |
| | | | 726/23 |
| 2003/0187812 A1 * | 10/2003 | Theimer | H04L 61/4511 |
| 2004/0215823 A1 * | 10/2004 | Kleinfelter | H04L 61/4511 |
| | | | 709/245 |

(Continued)

OTHER PUBLICATIONS

Intel Corporation, "Intel® Intelligent Fabric Processors," https://www.intel.com/content/www/us/en/products/network-io/programmable-ethernet-switch.html, Accessed Dec. 20, 2022, 7 pages.

(Continued)

*Primary Examiner* — Patrice L Winder
(74) *Attorney, Agent, or Firm* — Ryan, Mason & Lewis, LLP

(57) ABSTRACT

A method in an illustrative embodiment includes storing one or more mapping entries of domain names to Internet protocol (IP) addresses in a cache of a programmable switch, wherein the mapping entries are obtained according to historical DNS responses from a DNS server; acquiring, by the programmable switch, a domain name in a DNS request received from a client; searching the cache of the programmable switch for an IP address corresponding to the domain name; generating, by the programmable switch according to the DNS request and the IP address corresponding to the domain name if the IP address is found, a DNS response that is to be sent to the client, wherein the DNS response comprises the IP address corresponding to the domain name that is found in the cache; and sending, by the programmable switch, the DNS response comprising the IP address to the client.

20 Claims, 6 Drawing Sheets

(56) References Cited

U.S. PATENT DOCUMENTS

| | | | | |
|---|---|---|---|---|
| 2005/0259645 A1* | 11/2005 | Chen | H04L 61/4511 | |
| | | | 370/389 | |
| 2007/0118669 A1* | 5/2007 | Rand | H04L 63/20 | |
| | | | 709/245 | |
| 2013/0198269 A1* | 8/2013 | Fleischman | H04L 61/4511 | |
| | | | 709/203 | |
| 2015/0215267 A1* | 7/2015 | Kagan | H04L 61/4511 | |
| | | | 709/245 | |
| 2015/0350154 A1* | 12/2015 | Myla | H04L 61/4511 | |
| | | | 709/245 | |
| 2015/0358276 A1* | 12/2015 | Liu | H04L 61/4511 | |
| | | | 726/1 | |
| 2017/0099316 A1* | 4/2017 | Bisiaux | H04L 61/4511 | |
| 2017/0111313 A1* | 4/2017 | Lear | H04L 61/4511 | |
| 2017/0180414 A1* | 6/2017 | Andrews | H04L 63/1458 | |
| 2018/0337943 A1* | 11/2018 | Arnell | H04L 41/08 | |
| 2018/0367627 A1* | 12/2018 | Hooda | H04L 61/4511 | |
| 2020/0213265 A1* | 7/2020 | Deshpande | H04L 61/4511 | |
| 2021/0021634 A1* | 1/2021 | Babakian | H04L 61/4511 | |
| 2021/0021883 A1* | 1/2021 | Parekh | H04N 21/237 | |
| 2021/0400085 A1* | 12/2021 | Stokes | H04L 63/20 | |
| 2022/0294825 A1* | 9/2022 | Théberge | H04L 63/101 | |
| 2023/0396584 A1* | 12/2023 | Brecl | H04L 61/4511 | |

OTHER PUBLICATIONS

Intel Corporation, "Intel® Tofino ™ Intelligent Fabric Processors," https://www.intel.com/content/www/us/en/products/network-io/programmable-ethernet-switch/tofino-3-product-brochure.html, Nov. 2021, 14 pages.

* cited by examiner

PROGRAMMABLE SWITCH-BASED METHOD FOR PROVIDING DOMAIN NAME SYSTEM SERVICE

RELATED APPLICATION

The present application claims priority to Chinese Patent Application No. 202310079515.4, filed Jan. 20, 2023, and entitled "Programmable Switch-Based Method for Providing Domain Name System Service," which is incorporated by reference herein in its entirety.

FIELD

Embodiments of the present disclosure relate to the technical field of computers, and more specifically, to a programmable switch-based method for providing a domain name system (DNS) service.

BACKGROUND

Nodes on the Internet can be identified using Internet protocol (IP) addresses and can be accessed through IP addresses, but even if a 32-bit binary IP address is written in the form of 4 decimal digits from 0 to 255, it is still too long and too difficult to remember. The domain name system (DNS) is a naming system for computer and network services organized into a domain hierarchy, which is used for TCP/IP networks and enables easier access to the Internet by serving as a distributed database that maps domain names and IP addresses to each other. A domain name can associate an IP address to a meaningful set of characters. When a user visits a website, he or she can enter either the IP address of that website or its domain name. For access, the two are equivalent, and for the user, the domain name is easier to remember compared with the IP address.

A DNS server is a server used to specifically respond to DNS searching. When a user enters a domain name such as "dell.com" into a browser of a user device, the user device will send a DNS searching request over the network to a DNS server, and the DNS server will find the corresponding IP address for the attached domain name according to the DNS request and return a DNS response carrying the IP address to the user device. After receiving the IP address, the browser of the user device can use the IP address to communicate with a source server or a content distribution network (CDN) edge server to access the website information.

Due to the ongoing development of information networks, the demand for data processing continues to grow, and DNS servers will also receive a large number of accesses. DNS servers may fail for a variety of reasons, such as power failures, network attacks, hardware failures, and so on. Service disruptions of DNS servers may delay the response of a large number of client searches. If a DNS server fails and the response is delivered too late, a client may suffer a loss.

SUMMARY

According to example embodiments of the present disclosure, a technical solution for providing DNS services is provided, which is used for providing DNS services to clients quickly.

In a first aspect of the present disclosure, a method for providing a DNS service is provided, comprising: storing one or more mapping entries of domain names to IP addresses in a cache of a programmable switch, wherein the mapping entries are obtained according to historical DNS responses from a DNS server; acquiring, by the programmable switch, a domain name in a DNS request received from a client; searching the cache of the programmable switch for an IP address corresponding to the domain name; generating, by the programmable switch according to the DNS request and the IP address corresponding to the domain name if the IP address is found, a DNS response that is to be sent to the client, wherein the DNS response comprises the IP address corresponding to the domain name that is found in the cache; and sending, by the programmable switch, the DNS response comprising the IP address to the client.

By implementing the method provided in the first aspect, DNS services can be quickly provided to clients by a programmable switch, which can reduce the response time, improve the search efficiency, and save processing resources.

In a second aspect of the present disclosure, a programmable switch for providing a DNS service is provided, comprising: a processor; and a memory coupled to the processor, the memory having instructions stored therein, wherein the instructions, when executed by the processor, perform operations including: storing one or more mapping entries of domain names to IP addresses in a cache, wherein the mapping entries are obtained according to historical DNS responses from a DNS server; acquiring a domain name in a DNS request received from a client; searching the cache for an IP address corresponding to the domain name; generating, according to the DNS request and the IP address corresponding to the domain name if the IP address is found, a DNS response that is to be sent to the client, wherein the DNS response comprises the IP address corresponding to the domain name that is found in the cache; and sending the DNS response comprising the IP address to the client.

By implementing the programmable switch provided in the second aspect, DNS services can be quickly provided to clients by a programmable switch, which can reduce the response time, improve the search efficiency, and save processing resources.

In a third aspect of the present disclosure, a computer program product is provided. The computer program product is tangibly stored on a non-transitory computer-readable medium and includes machine-executable instructions. The machine-executable instructions, when executed by a machine, cause the machine to execute the method according to the first aspect of the present disclosure.

In a fourth aspect of the present disclosure, there is provided a non-transitory computer-readable storage medium having a computer program stored thereon that, when executed by a device, causes the device to perform the method according to the first aspect of the present disclosure.

It can be seen from the above description that, with the solutions according to various embodiments of the present disclosure, DNS services can be quickly provided to clients by a programmable switch, which can reduce the response time, improve the search efficiency, and save processing resources. In addition, it is also possible to improve the security of DNS services and guard against network attacks.

It should be understood that this Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

DETAILED DESCRIPTION

Figure 1:
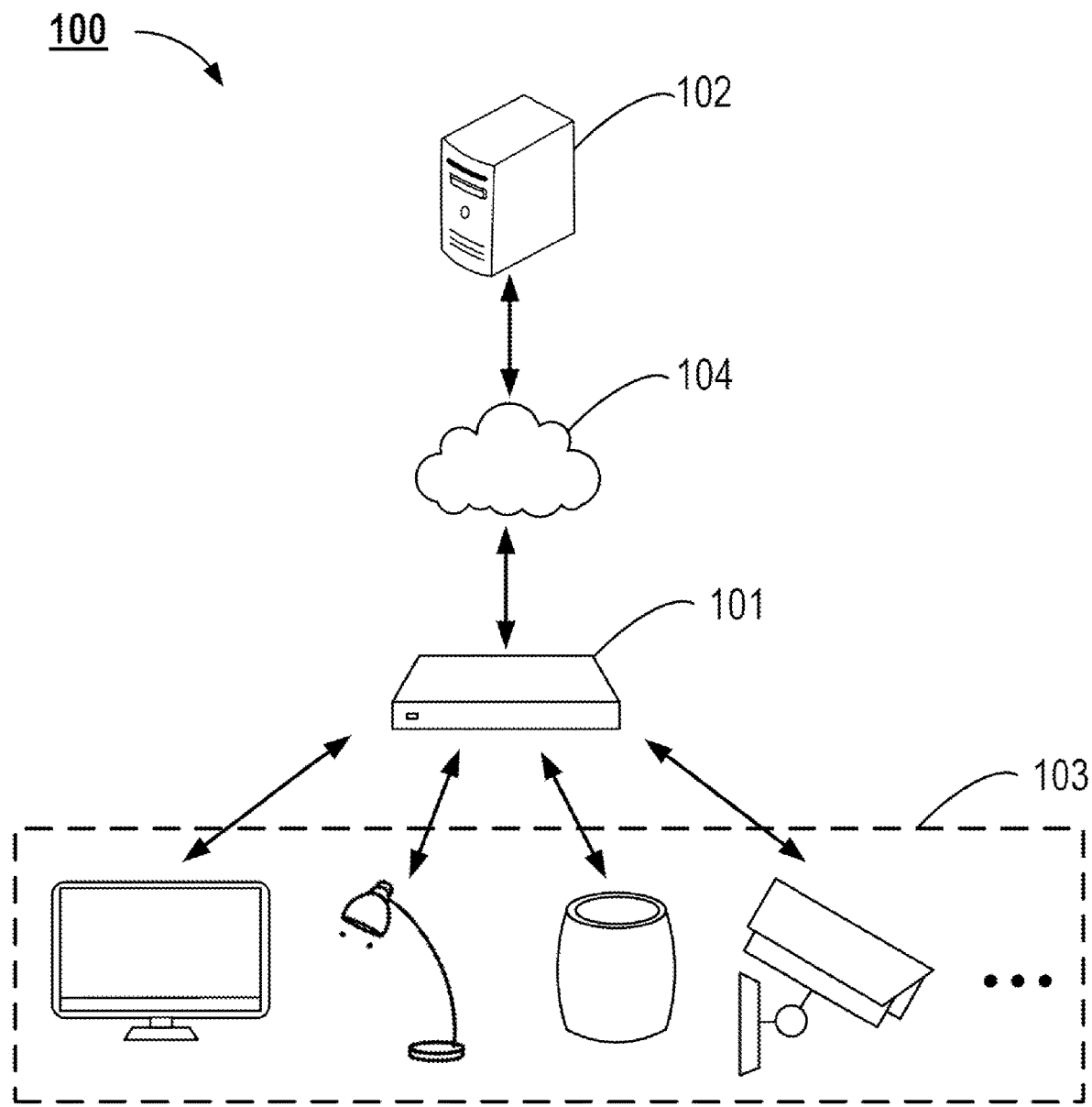
FIG. 1 illustrates a schematic diagram of an application scenario according to some embodiments of the present disclosure.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

A DNS server is a server used to specifically respond to DNS searching. When a user enters a domain name into a browser, the user device may send a DNS searching request over the network to the DNS server, and the DNS server finds the corresponding IP address for the requested domain name according to the DNS request and returns a DNS response carrying the IP address to the user device. After receiving the IP address, the browser of the user device can use the IP address to communicate with a source server or a content distribution network (CDN) edge server to access the website information.

A DNS message is divided into a search request and a search response, the request and the response having basically the same message structure. The request and response messages each include a transaction identifier (ID), i.e., the identifier of the DNS message. The value of this field is the same for the request message and its corresponding reply message. With it, it is possible to distinguish which DNS request a DNS reply message is responding to. The DNS message includes a search question area section, which is used to indicate the question of a DNS search request and may include a search name field, a search type field, a search class field, and so on. The search name is typically a domain name to be searched for, or sometimes, it may also be an IP address which is used for reverse search. The search type is the resource type of the DNS search request, and generally the search type is type A, which indicates that the corresponding IP address is acquired through the domain name. The search class refers to the address type, usually an Internet address, with a value of 1. The DNS response message includes a resource record section, and its answer question area field may include resource data, which indicates data of the relevant resource record returned as requested by the search field, such as the IP address corresponding to the requested domain name. The answer question area field of the DNS response message may also include a time to live (TTL), usually in seconds, which indicates the life cycle of a resource record and is generally used for the determination of the time to save and use the cached data after the address resolution program has fetched the resource record, and at the same time, the TTL may also indicate how stable this resource record is, with a large value assigned to stable information.

Domain names need to maintain uniqueness. The Internet uses a hierarchical naming method when naming English domain names, where each English domain name is a sequence of labels composed of letters (A-Z or a-z, which uppercase and lowercase letters are equivalent), numbers (0-9), and hyphen (-), wherein the sequence of labels has a total length that cannot exceed 255 characters and is divided by dots into individual labels, each of which can be seen as a level of domain names. The domain name at the lowest level is written on the left, and the domain name at the highest level is written on the right. Domain names at each level are managed by the domain name authority at the level above them, while the top-level domain names are managed by the Internet Corporation for Assigned Names and Numbers (ICANN).

DNS servers are used to resolve domain names, and store a mapping relationship between domain names and IP addresses. By means of hierarchy division from high to low, they can be divided into root domain name servers, top-level domain name servers, authoritative domain name servers, and so on. The root domain name servers are the highest-level domain name servers and the most important domain name servers. All root domain name servers store the domain names of all top-level domain name servers and their IP addresses. A top-level domain name server is responsible for the management of the second-level domain names registered under that top-level domain name server. An authoritative domain name server is responsible for the management of the domain names of a zone. The domain name of each client needs to be registered with a certain authoritative domain name server, so the authoritative domain name server knows the mapping relationship of the domain names under its authority to IP addresses. In addition, the authoritative domain name server knows the addresses of its subordinate domain name servers. A local domain name server, also known as a DNS resolver, is used to first receive a DNS search request from a local client, and the DNS resolver, acting as a proxy resolution server, forwards a DNS message to the hierarchy of domain name servers described above. In a typical DNS search without any caching, the DNS resolver interacts with other DNS servers to find the corresponding IP address once it receives DNS search information from a client.

Common search methods for domain name resolution may include recursive searches and iterative searches. The recursive search means that if a local DNS resolver inquired by a client does not know the IP address of a searched domain name, the local DNS resolver acts as a DNS client and continues to send the search request message to other root domain name servers, that is, it continues to search on behalf of the client. When the IP address corresponding to the domain name is found, the search result will be passed among the previously commissioned domain name servers and eventually passed back to the user client. The iterative search means that when there is no search result, the DNS server that receives the search request will provide the client with the address of another DNS server that can resolve the search request, wherein when the client sends the search request, this DNS server does not reply directly with a search result but tells the client the address of another DNS server, then the client submits the request to the another DNS server, and the loop continues in sequence until a search result is returned.

The local domain name server eventually passes the IP address of the source server back to the client. Using this IP address, the client can initiate a search directly to the source server, and the source server will respond by sending website data that can be interpreted and displayed by a webpage browser.

Due to the development of information networks, the demand for data processing continues to grow, and DNS servers will also receive a large number of accesses. Disruptions of DNS servers may cause the influence of delayed responses to a large number of client searches. DNS servers may fail for a variety of reasons, such as power failures, network attacks, hardware failures, and so on. For latency-sensitive clients, such as some Internet of Things devices, they may run applications with tight response time, such as industrial control, mobile automation, remote control, real-time media, and so on. Latency-sensitive applications typically have stringent requirements for the response time of transactions and their variability. These latency-sensitive applications are affected by DNS server latency, and if a DNS server fails, the response is delivered too late, which results in potentially significant losses for latency-sensitive applications.

DNS servers are vulnerable to distributed denial-of-service (DDoS) attacks, in which a DNS server receives a large amount of information requesting replies, which consumes network bandwidth or system resources, causing the DNS server to become overloaded to the point of collapse and ceasing to provide normal network services. DDoS attacks can have a significant impact on the DNS database and its users, thus rendering the Internet unusable for domain name resolution services. In the event of a severe DNS server disruption, some users may experience latency due to the excessive number of requests to be handled by backup servers, but if the DNS servers are severely disrupted, a large percentage of Internet users will not be able to access a website properly.

DNS servers are also vulnerable to man-in-the-middle attacks. The man-in-the-middle attack means that an attacker creates separate connections with both ends of the communication and exchanges data it receives, making the two ends of the communication believe that they are in conversation directly with each other over a private connection, while in fact the entire session is fully controlled by the attacker. In a man-in-the-middle attack, an attacker can intercept the conversation between the two communication parties and insert new content. A man-in-the-middle attack is an attack that lacks mutual authentication. The DNS resolver cannot verify the authenticity or integrity of data from the DNS server, because DNS does not specify a mechanism for servers to provide authentication details for the data they push down to clients, so it is vulnerable to man-in-the-middle attacks. An attacker uses the source IP address, the destination port number, the source port number, and the DNS transaction ID of the DNS server to create a DNS response message, and the client cannot verify it and can only trust that the data received from the attacker is reliable. As a result, the attacker can resolve the search request and then respond with incorrect information. This poses a significant risk to the security of the data.

To reduce access time and processing resources, DNS resolvers can cache some data, but this also suffers from the problem of inconsistent cached data or stale data, where the cached data may include security-critical information, for example, compromised keys. Current DNS protocols do not support propagating data updates or invalidations to DNS servers or caches fast and securely in any way.

Embodiments of the present disclosure provide a programmable switch-based method for providing a DNS service, which leverages the programmability of programmable switches to build high-performance intelligent DNS servers on programmable switches, so as to provide secure and fast DNS resolution services to clients. This is an in-network DNS solution that breaks through the span and limitations of implementing DNS services in network devices and provides significant performance improvements compared with software-based DNS search solutions. The method may include: storing one or more mapping entries of domain names to IP addresses in a cache of a programmable switch, wherein the mapping entries are obtained according to historical DNS responses from a DNS server; acquiring, by the programmable switch, a domain name in a DNS request received from a client; searching the cache of the programmable switch for an IP address corresponding to the domain name; generating, by the programmable switch according to the DNS request and the IP address corresponding to the domain name if the IP address is found, a DNS response that is to be sent to the client, wherein the DNS response comprises the IP address corresponding to the domain name that is found in the cache; and sending, by the programmable switch, the DNS response comprising the IP address to the client.

By implementing this method, DNS services can be quickly provided to clients by a programmable switch, which can reduce the response time, improve the search efficiency, and save processing resources. In addition, it is also possible to enable defense against DDoS attacks on DNS through rate limiting, and also to enable defense against man-in-the-middle attacks by securely encrypting DNS requests through the control plane, all of which can further improve the security of DNS services.

FIG. 1 illustrates a schematic diagram of application scenario 100 according to some embodiments of the present disclosure. As shown in FIG. 1, in application scenario 100, switch 101, public DNS server 102, a plurality of edge terminal devices 103, etc., are illustrated. Among them, switch 101 is an edge network device, which may be a programmable switch. The programmable switch is a network device that can implement functions flexibly through programming, and support an online upgrade function. The programmable switch can be programmed, for example, by the programming protocol-independent packet processors language, or P4 language for short. P4 is a declarative programming language that can be used for programming to send instructions to devices (e.g., switches, network cards, firewalls, filters, etc.) in the data forwarding plane to indicate how to process data packets.

Switch 101 may communicate with public DNS server 102 via network 104 to acquire information such as IP addresses corresponding to a plurality of domain names from public DNS server 102. Switch 101 may be directly connected locally to a plurality of edge terminal devices 103. Edge terminal devices 103 may be, for example, smart terminal devices such as computers, desk lamps, smart speakers, cameras, or, for example, Internet of Things devices such as air conditioner controllers, smart locks, traffic lights, etc.

Switch 101 can serve as a programmable edge DNS server that serves the edge terminal devices, which achieves the provision of high-performance DNS services for the edge terminal devices to reduce the response time for DNS service requests, so that the edge terminal devices can obtain the IP address corresponding to the requested domain name faster. Switch 101 may include a cache area for storing a plurality of mapping relationships between domain names and IP addresses, and when receiving a DNS service request from a particular edge terminal device 103, it quickly searches the cache area for an IP address corresponding to the requested domain name, generates a DNS response including the IP address, and then sends it to that edge terminal device 103. Thus, the programmable switch acting as a DNS server can support high-frequency access from edge terminal devices, which helps to increase the response speed and stability of DNS search requests.

In embodiments of the present disclosure, secure and fast DNS resolution services are provided to clients by building a high-performance intelligent DNS server on a programmable switch. At the same time, the intelligent DNS server can support seamless integration with a data center network so that it can automatically and intelligently determine the user's incoming IP and return it to the user. In order to realize the seamless integration, the intelligent DNS server does not require an IP address like a conventional DNS server does, and it can snoop and respond to DNS requests through a switch, such as a programmable switch. A plurality of mapping entries of domain names to IP addresses can be stored in the cache. When a DNS request is received from a client, a mapping entry is first looked for in the cache based on the requested domain name, and if the IP address corresponding to the domain name is found, a DNS response carrying the IP address is generated and returned to the client. For a DNS request for which no mapping entry is found in the cache, the intelligent DNS server can act as a DNS resolver to recursively resolve the DNS request according to the DNS request and then, when a DNS response is obtained, forward it to the client. Then, a new mapping entry of the domain name to the IP address is stored based on the obtained DNS response.

The architecture of the programmable switch may include a programmable resolver, a programmable match action pipeline, and a programmable inverse resolver, among others. As an intelligent DNS server in a network, switch 101 is built on the basis that the data plane is programmable. However, it is not limited to the data plane, but, instead, uses an architecture of converged data and control planes to achieve higher performance, which can provide clients with very low DNS search latency due to cached mapping entries. Switch 101 can be designed to support the following functions: message exchanging for non-DNS records, responding to record searches of multiple lengths, updating DNS mapping entries in the cache based on a DNS response when the switch passively observes the DNS response on the line, maintaining a TTL for each cached domain name, recursive resolution having a multi-threaded control plane, guarding against DDoS attacks for DNS on a programmable switch, and guarding against man-in-the-middle attacks via authentication.

Figure 2:
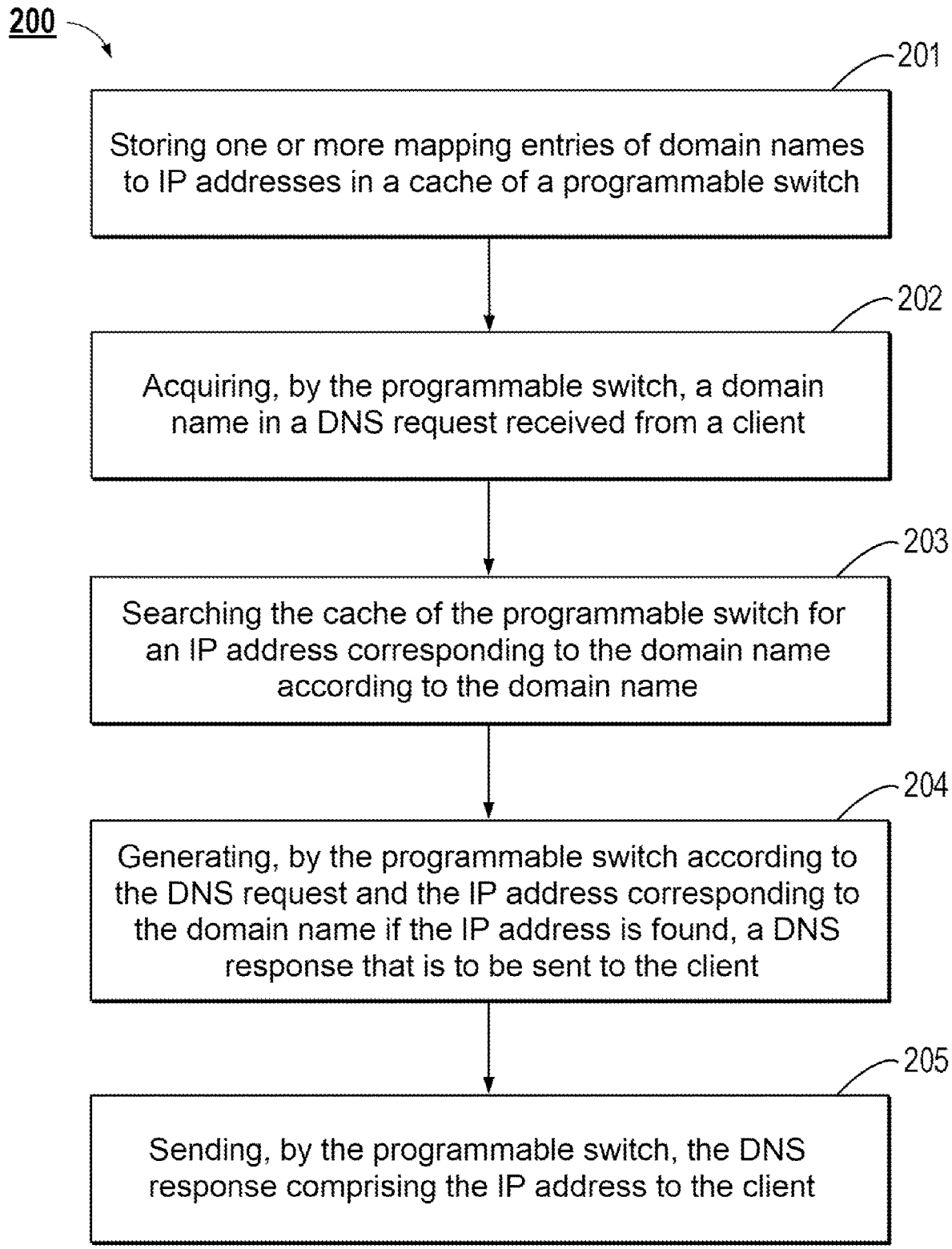
FIG. 2 illustrates a flow chart of a method for providing a DNS service according to some embodiments of the present disclosure.

FIG. 2 illustrates a flow chart of method 200 for providing a DNS service according to some embodiments of the present disclosure. Using method 200, it is possible to quickly and securely provide DNS services to clients by a programmable switch with programmable performance. It should be understood that the programmable switch is only an example implementation provided by embodiments of the present disclosure. Embodiments of the present disclosure do not limit the device type, etc., of the electronic device that implements method 200 in any way, and in other embodiments, method 200 may be performed by other network devices with similar functions. In embodiments of the present disclosure, the subject implementing method 200 may be implemented by an entity device or may be implemented by a plurality of entity devices together. It is to be understood that the subject implementing method 200 may be a logical function module in an entity device, or may be a logical function module composed of a plurality of entity devices. It should be understood that, in the following embodiments of the present disclosure, the steps in the method provided in embodiments of the present disclosure may be performed by one entity device, or the steps in the method provided in embodiments of the present disclosure may be performed by a plurality of entity devices cooperatively, which is not limited at all in embodiments of the present disclosure. It should be understood that method 200 may also include additional blocks that are not shown and/or may omit blocks that are shown, and the scope of the present disclosure is not limited in this regard.

At block 201, one or more mapping entries of domain names to IP addresses are stored in a cache of a programmable switch, wherein the mapping entries are obtained according to historical DNS responses from a DNS server. At block 202, a domain name in a DNS request received from a client is acquired by the programmable switch. At block 203, the cache of the programmable switch is searched for an IP address corresponding to the domain name, with the search being performed according to the domain name. At block 204, if the IP address corresponding to the domain name is found, a DNS response that is to be sent to the client is generated by the programmable switch according to the DNS request and the IP address, wherein the DNS response comprises the IP address corresponding to the domain name that is found in the cache. At block 205, the DNS response comprising the IP address is sent by the programmable switch to the client. By implementing method 200, DNS services can be quickly provided to clients by a programmable switch, which can reduce the response time, improve the search efficiency, and save processing resources. In some embodiments, the programmable switch supports programming using the P4 language.

In some embodiments, prior to acquiring, by the programmable switch, a domain name in a DNS request received from a client, a message from the client may be received by the programmable switch, and it is then determined by the programmable switch that the message is a DNS request requiring a DNS response.

In some embodiments, after the message from the client is received by the programmable switch, it is necessary for the programmable switch to determine whether the message is a DNS message. If the message is not a DNS message, the message is forwarded by the programmable switch, and if the message is a DNS message, it is determined by the programmable switch whether the received DNS message reaches a predetermined rate. If it is determined that the DNS message received exceeds the predetermined rate, the DNS message is discarded by the programmable switch.

In some embodiments, if it is determined that the DNS message received does not exceed the predetermined rate, it is confirmed whether the client is valid by the programmable switch. If it is confirmed that the client is invalid, the DNS message is discarded by the programmable switch, and if it is confirmed that the client is valid, the programmable switch determines whether the DNS message is the DNS request requiring the DNS response.

In some embodiments, if it is determined that the DNS message is a DNS response message, an indicated domain name and IP address are acquired from the DNS response message by the programmable switch, and a mapping entry of the indicated domain name to the IP address is updated by the programmable switch.

In some embodiments, the DNS response is a first DNS response, and if the IP address corresponding to the domain name is not found in the cache, proxy resolution of the domain name is performed by the programmable switch, so as to request the DNS server for the IP address. Upon acquiring a second DNS response containing the IP address from the DNS server, the second DNS response comprising the IP address is sent to the client by the programmable switch. Then, according to the correspondence between the domain name and the IP address in the second DNS response, the programmable switch stores a mapping entry of the domain name to the IP address in the cache.

Data plane functions and control plane functions of an intelligent DNS will be described below with reference to FIGS. 3, 4, and 5. As previously described, in embodiments of the present disclosure, an intelligent DNS may be implemented by a programmable switch.

Figure 3:
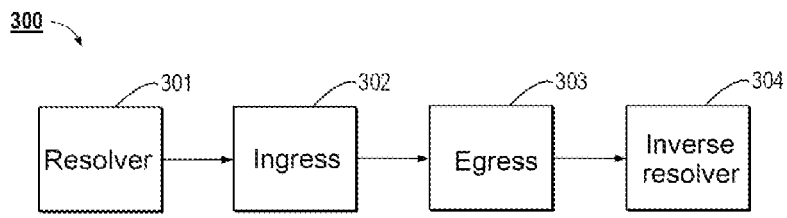
FIG. 3 illustrates a schematic diagram of an example of functional modules of an intelligent DNS according to some embodiments of the present disclosure.

FIG. 3 illustrates a schematic diagram of an example of functional modules of an intelligent DNS according to some embodiments of the present disclosure. Embodiments of the present disclosure may divide data plane 300 into functional modules. For example, the functions of data plane 300 may be divided into individual functional modules, or two or more functions of data plane 300 may be integrated into one functional module, which is not limited by this embodiment. The various functional modules may be implemented by software, hardware, or a combination of both. FIG. 3 illustrates the design of data plane 300 of the intelligent DNS. As shown in FIG. 3, messages can be processed on the data plane in four stages, wherein each stage has a special task so as to support parallel processing of the received messages. These four stages include: resolver 301, ingress 302, egress 303, and inverse resolver 304.

Resolver 301 is used to extract a specific field from a message. Ingress 302 is used to process DNS behaviors. Egress 303 is used to handle message forwarding. Inverse resolver 304 is used to reconstruct the message to be sent.

Figure 4:
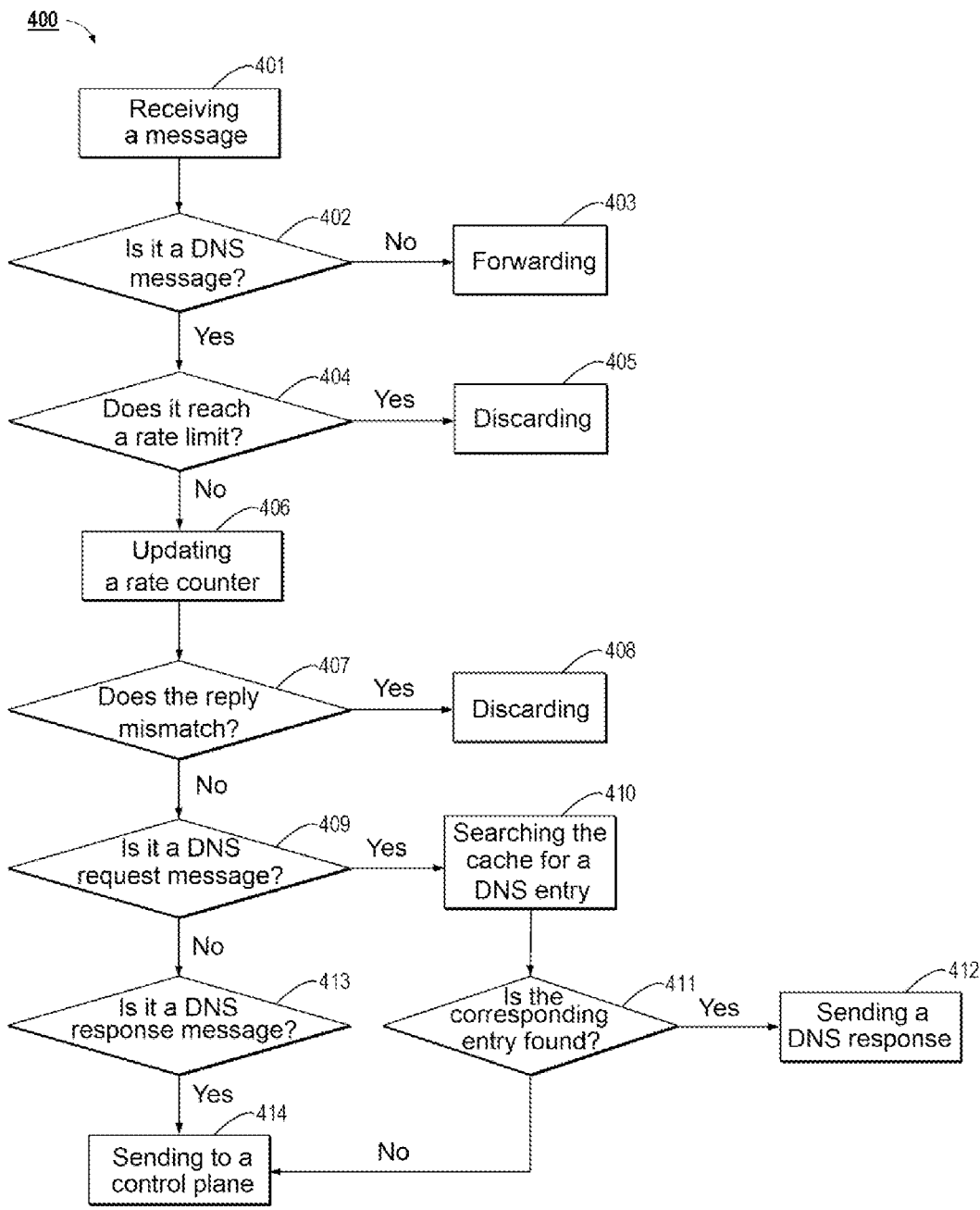
FIG. 4 illustrates a process diagram for performing operations in a data plane of an intelligent DNS according to some embodiments of the present disclosure.

FIG. 4 illustrates flow chart 400 of performing operations in a data plane. At block 401, a message is received. At block 402, it is checked whether the message is a supported DNS message, that is, each incoming message is checked by a resolver, and the message header is extracted to a DNS layer. By checking the identifier of the message header, it is judged whether the message is a DNS message, and the required DNS identifier cannot be found in a non-DNS message. The resolver must understand how the length of a DNS header varies with the length of a requested domain. If it is determined that the message is not a DNS message, the process proceeds to block 403 where the message is forwarded through the switch function. If it is determined that the message is a DNS message, the process proceeds to block 404.

At block 404, it is checked whether the DNS message has reached a predetermined rate limit. If it reaches the rate limit, the process proceeds to block 405 where this DNS message will be discarded. If it does not reach the predetermined rate limit, the process proceeds to block 406, and a rate counter is updated. Since a DDoS attack is a large number of messages being sent quickly to consume a lot of server resources, this operation of rate judgment can be effective in guarding against DDoS attacks on DNS. Then, the process proceeds to block 407.

At block 407, it is checked whether a DNS reply message has been requested, that is, whether the reply matches is checked, and if the reply message has not been requested by a valid client, i.e., the reply mismatches, then the process proceeds to block 408 where the DNS message will be discarded. If it matches, i.e., the reply message is requested by a valid client, the process proceeds to block 409. This matching operation is performed to determine that the message is from a valid client and should be processed, and to guard against a large number of spurious and invalid messages sent by an attacker.

At block 409, a check (or other actions) as to whether the DNS message is a DNS request that requires a DNS response can be performed by examining the header field. If it requires a DNS response, at block 410, this DNS request is passed to a DNS table stored in the cache, the DNS table storing a plurality of mapping entries of domain names to IP addresses, and the DNS table in the cache is searched for the domain name in the DNS request. At block 411, if the IP address corresponding to the domain name is found, a DNS response message is created by swapping the source address and the destination address and appending a DNS response header. Inverse resolver 304 is used to reconstruct the message to be sent. The inverse resolver is a mirror of the resolver, which sends out all resolved headers. If response fields are added, the inverse resolver will also send out those response fields. If there is no use condition in the inverse resolver, the sending of the header is implicitly controlled using a valid bit that marks whether the field should be sent or not. Then, at block 412, the DNS response is sent. Egress 303 is used to forward the DNS response normally and provide a copy to the control plane used to update the matching action table. When a message configured with a recursive expectation bit does not hit an entry in the DNS table, it is not forwarded, but is sent to the control plane for resolution at block 414. If the DNS message is not a DNS request, at block 413, it is determined whether it is a DNS response message, and if yes, the process proceeds to block 414 where it is sent to the control plane for resolution.

Figure 5:
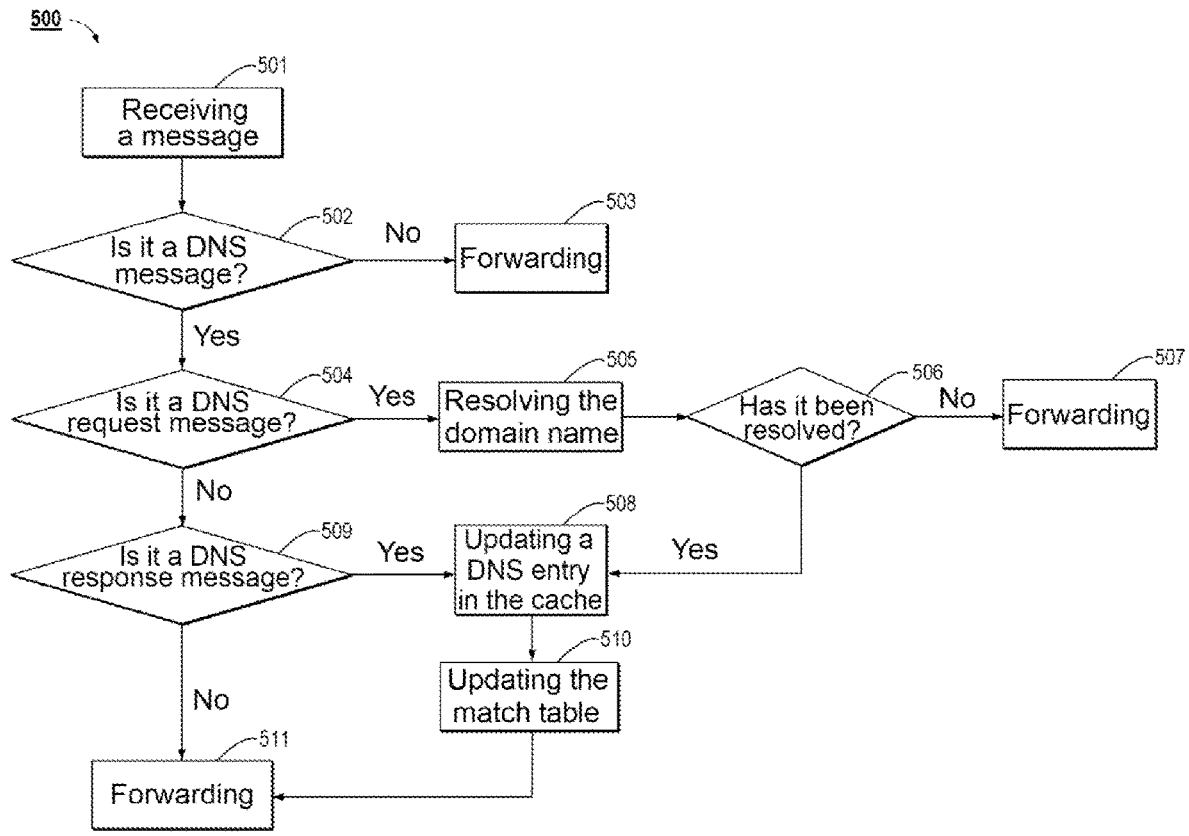
FIG. 5 illustrates a process diagram for performing operations in a control plane of an intelligent DNS according to some embodiments of the present disclosure.

FIG. 5 illustrates flow chart 500 of performing operations in a control plane. At block 501, a message is received. At block 502, the control plane processes each message received from the data plane to determine whether it is a DNS message. Each message is either a digest containing the MAC address and source port acquired from the switch or a complete DNS message, wherein the complete DNS message may be a request for recursive resolution or a response to cache update. For the digest, the control plane updates a switch forwarding table and forwards it. At block 503, if the received message is not a DNS message, it is forwarded using the switch function. If it is determined that the message is a DNS message, at block 504, it is determined whether it is a DNS request message. If a recursive DNS request requiring bit setting is received, the process proceeds to block 505 where the control plane recursively resolves the request. At block 506, it is determined whether the domain name can be resolved, and if the domain name cannot be resolved on the control plane, the process proceeds to block 507 where the control plane will send a corresponding DNS error response. If it can be resolved, the process proceeds to block 508, where a DNS mapping entry in the local cache is updated based on the correspondence between the domain name and the IP address in the resolution. Then, at block 510, the match table is updated. The match table will be configured for DNS filtering of the data plane, so as to be used to discard mismatched DNS reply messages, which is suitable for mitigating amplification attacks against DNS.

At block 509, if a complete message that is not a DNS request message is received, it is determined whether it is a DNS response message. If it is a DNS response message, the fields in the DNS response are extracted, and the process proceeds to block 508 where a DNS mapping entry in the local cache is updated based on the correspondence between the domain name and IP address extracted from that DNS response. Then, at block 510, the match table is updated. If it is determined that it is neither a DNS request message nor a DNS response message, the process proceeds to block 511 where it is forwarded using the switch function.

It can be understood that the specific implementation of the various functions included in the foregoing various modules may be implemented with reference to the descriptions in other embodiments. The modules and/or units may be implemented in part or in whole as hardware modules, software modules, firmware modules, or any combination thereof. In particular, the processes, methods, or procedures described in some embodiments may be implemented by a programmable switch or hardware in other network devices.

In some embodiments, a TTL is set for each mapping entry in the mapping entries, such as a first mapping entry, and the first mapping entry in the cache is deleted by the programmable switch when the TTL of the first mapping entry expires. Reference is made to the function and process of cache updating of an intelligent DNS server shown in FIGS. 6 and 7.

To improve the search efficiency of DNS and to reduce the load on the domain name servers in the network and the number of DNS searching messages on the Internet, a cache may be used in a local intelligent DNS server implemented on a programmable switch to store the most recently searched domain names and records of where the domain name mapping information was obtained. Since mapping relationships of domain names to IP addresses are not permanent and network servers may change their IP addresses, in order to keep the contents of the cache correct, the local intelligent DNS server can set a timer for each item of content and remove the items that have been stored for more than a reasonable amount of time, for example, storing each item for 48 hours. This time limit is referred to herein as a time to live (TTL). During the TTL time limit, if any other client sends a request for this domain name, the local intelligent DNS server can skip the regular DNS lookup process and instead respond to the client using the IP address stored in the cache. Once the TTL time limit for a cached item expires, the local intelligent DNS server needs to retrieve the IP address again and create a new item in its cache. If a client has searched the intelligent DNS server for an IP address of a domain name recently, the IP address corresponding to that domain name is stored in the cache of the intelligent DNS server. Therefore, when another client searches for this domain name, the intelligent DNS server directly returns the IP address of the last searching stored in its cache to that another client.

Figure 6:
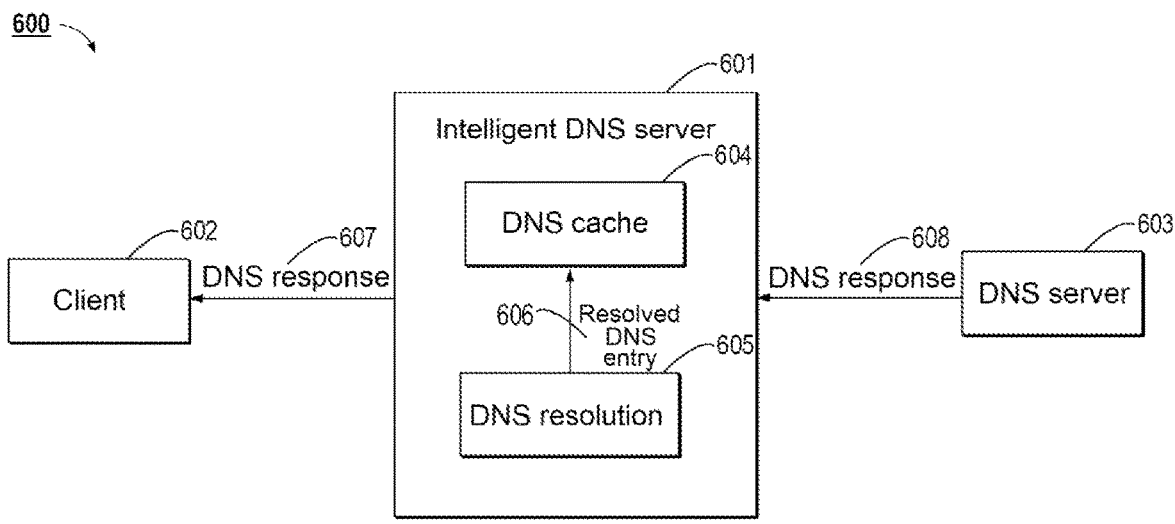
FIG. 6 illustrates a functional schematic diagram of cache updating of an intelligent DNS according to some embodiments of the present disclosure.

Reference is made to functional schematic diagram 600 of cache updating of an intelligent DNS server shown in FIG. 6. The control plane of intelligent DNS server 601 is used to manage DNS cache 604 and DNS resolution 605. Intelligent DNS server 601 is used to determine which DNS information needs to be cached and insert it into the hardware cache table. At least three timings for updating the on-board cache are included: when a DNS response passes through the switch, when a recursive searching is answered, and when the TTL of the cached domain changes. The control plane provides an intelligent DNS cache updating mechanism that introduces for a cached DNS response message a TTL that can be automatically reduced so that the cached entries are managed by monitoring the TTLs. If it is detected that TTL>0 in the DNS response, then it can be retained, and if TTL<0, it is directly discarded. The TTL of a cached entry will decrease gradually. When the TTL is detected to be reduced to 0, the DNS record in the DNS cache will be automatically deleted.

Intelligent DNS server 601 can receive DNS response 608 from network DNS server 603, and resolve it via DNS resolution 605 function to extract the domain name and IP address in the message, and then send the resolved DNS entry 606 to DNS cache 604 for use in update of the cache table. When client 602 initiates a DNS request to intelligent DNS server 601, intelligent DNS server 601 extracts the domain name in that DNS request, and searches DNS cache 604 for whether there is a corresponding mapping entry. If the corresponding IP address is found, intelligent DNS server 601 generates DNS response 607 carrying that IP address and sends it to client 602. If the corresponding DNS entry is not found, intelligent DNS server 601 will act as the proxy of client 602 to request network DNS server 603 to resolve the IP address corresponding to the domain name. When intelligent DNS server 601 acquires DNS response 608 from network DNS server 603, intelligent DNS server 601 sends this DNS response to client 602, extracts correspondence information for the domain name to IP address in the DNS response, and stores it in DNS cache 604.

For a programmable switch, these cache updates can be managed using a model in a control plane of a P4 table. For example, a hardware cache may include 64 entries and manage them using the first-in-first-out (FIFO) eviction protocol. When the control plane caches a new entry in an already full hardware cache, the oldest entry will be removed. This function can be implemented by setting a timer-driven cache deletion mechanism. To keep the TTL of each DNS response accurate, the timer updates the TTLs of all DNS records stored in the control plane and data plane tables every second. When a DNS record reaches a TTL of 0, it will be removed from both caches.

Figures 7, 8:
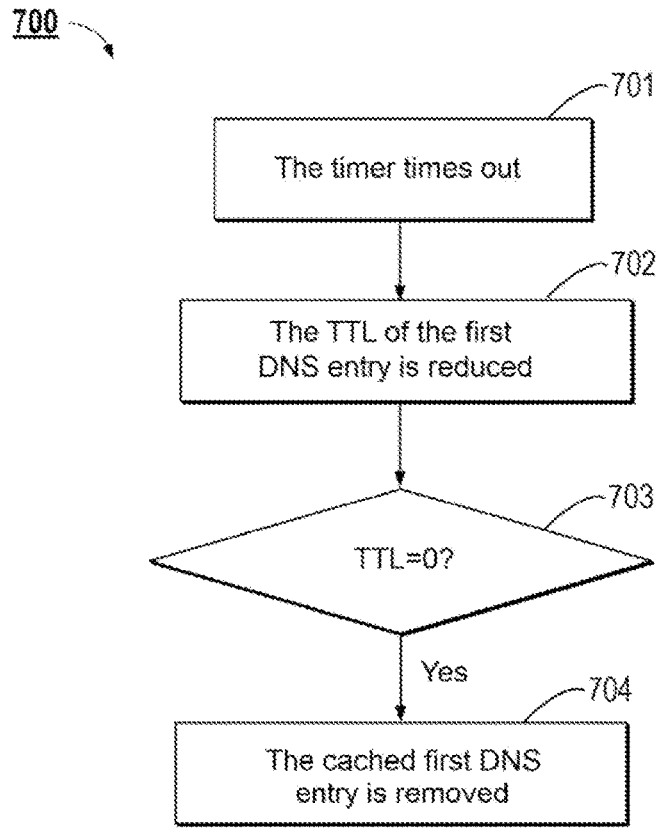
FIG. 7 illustrates a process diagram of cache updating according to some embodiments of the present disclosure.
FIG. 8 illustrates a schematic diagram of secure resolution of an intelligent DNS according to some embodiments of the present disclosure.

Reference is made to process 700 illustrating cache updating of an intelligent DNS server as shown in FIG. 7. At block 701, the timer times out. The process proceeds to block 702, where the TTL of the first DNS entry is gradually reduced. Here, the first DNS entry (also referred to as a first mapping entry) may refer to any DNS entry. At block 703, the TTL is continuously monitored to determine whether TTL=0. If the TTL is found to reach 0, then the process proceeds to block 704 where the cached first DNS entry is removed.

In some embodiments, the DNS request is converted by the programmable switch to a securely encrypted DNS request, wherein the securely encrypted DNS request comprises a DNS request based on Hypertext Transfer Protocol Secure (HTTPS) or a DNS request based on Transport Layer Security (TLS).

In some embodiments, DNS resolution is completed entirely by the control plane, which helps to enable HTTPS-based DNS messages or TLS-based DNS messages on intelligent DNSs. By leveraging these secure transport protocols, the control plane of an intelligent DNS, acting as a DNS adapter, can convert conventional DNS requests into secure DNS requests, thus enabling successful mitigation of man-in-the-middle attacks. When some devices cannot support secure DNS messages, the above technical solutions can help them meet the requirements of a zero-trust architecture.

FIG. 8 illustrates schematic diagram 800 of secure DNS resolution on an intelligent DNS server. Intelligent DNS server 801 and client 802 send and receive DNS message 806 to and from each other, and intelligent DNS server 801 includes a function for DNS resolution 803. By using DNS resolution 803 of the control plane, ordinary DNS requests can be converted to DNS requests based on secure transport protocols, e.g., HTTPS-based DNS requests, TLS-based DNS requests, and so on. For example, intelligent DNS server 801 and network DNS server 804 may send and receive HTTPS-based DNS message 807 to and from each other, and intelligent DNS server 801 and network DNS server 805 may send and receive TLS-based DNS message 808 to and from each other. The control plane may encrypt the DNS request, and by encrypting the DNS message using the HTTPS protocol or the TLS protocol, it can be ensured that no one can monitor the DNS request of the user. The use of DNS messages based on the HTTPS protocol or based on the TLS protocol can prevent eavesdropping and tampering on the transmission path.

By implementing the intelligent DNS server provided by this embodiment, DNS services can be quickly provided to clients by a programmable switch, which can reduce the response time, improve the search efficiency, and save processing resources. In addition, it is also possible to enable defense against DDoS attacks on DNS through rate limiting, and also to enable defense against man-in-the-middle attacks by securely encrypting DNS requests through the control plane, all of which can further improve the security of DNS services.

It can be understood that the above description is only illustrative and that the implementations of the various embodiments of the present disclosure are not limited to the above description, and in other embodiments, other devices, systems, and method steps may be used instead or additionally, and the scope of embodiments of the present disclosure is not limited in this regard.

In summary, the above embodiments of the present disclosure and combinations thereof describe the implementation of an intelligent DNS on a programmable switch. In a first aspect, the innovative architecture of a programmable switch-based intelligent DNS server is a good alternative to existing software-based solutions. The efficient operation of DNS searching can be successfully implemented on programmable switches using the P4 language. It can provide very high throughput and very low latency for the communication transmission of latency-sensitive Internet of Things edge devices. In the second aspect, message rate monitoring is provided for protecting against DDoS attacks, wherein by using a programmable switch, DDoS attack messages for DNS can be discarded in the first step after entering the data plane. The hardware-based data plane of the programmable switch provides very high throughput so that it can receive DDoS attack messages for DNS without blocking normal messages. By introducing rate limits and match tables in the data plane, DDoS attack messages for DNS can be quickly identified and discarded. In the third aspect, an intelligent DNS cache updating mechanism is provided that introduces for a cached DNS response message a TTL that can be automatically reduced so that the cached entries are managed by monitoring the TTLs. When the TTL is detected to be reduced to 0, the DNS record in the DNS cache will be automatically deleted. This allows indicating data updates or data invalidation to the DNS server or cache in a fast and secure way. In the fourth aspect, the intelligent DNS can mitigate man-in-the-middle attacks. By implementing DNS resolution in the control plane of the programmable switch, the exchange of DNS messages based on secure DNS protocols such as HTTPS protocols or TLS protocols between the programmable switch and the network DNS server can be achieved. The programmable switch plays an important role between a client and a DNS server and can act as an adapter for converting conventional insecure DNS messages to DNS messages based on secure DNS protocols.

Figure 9:
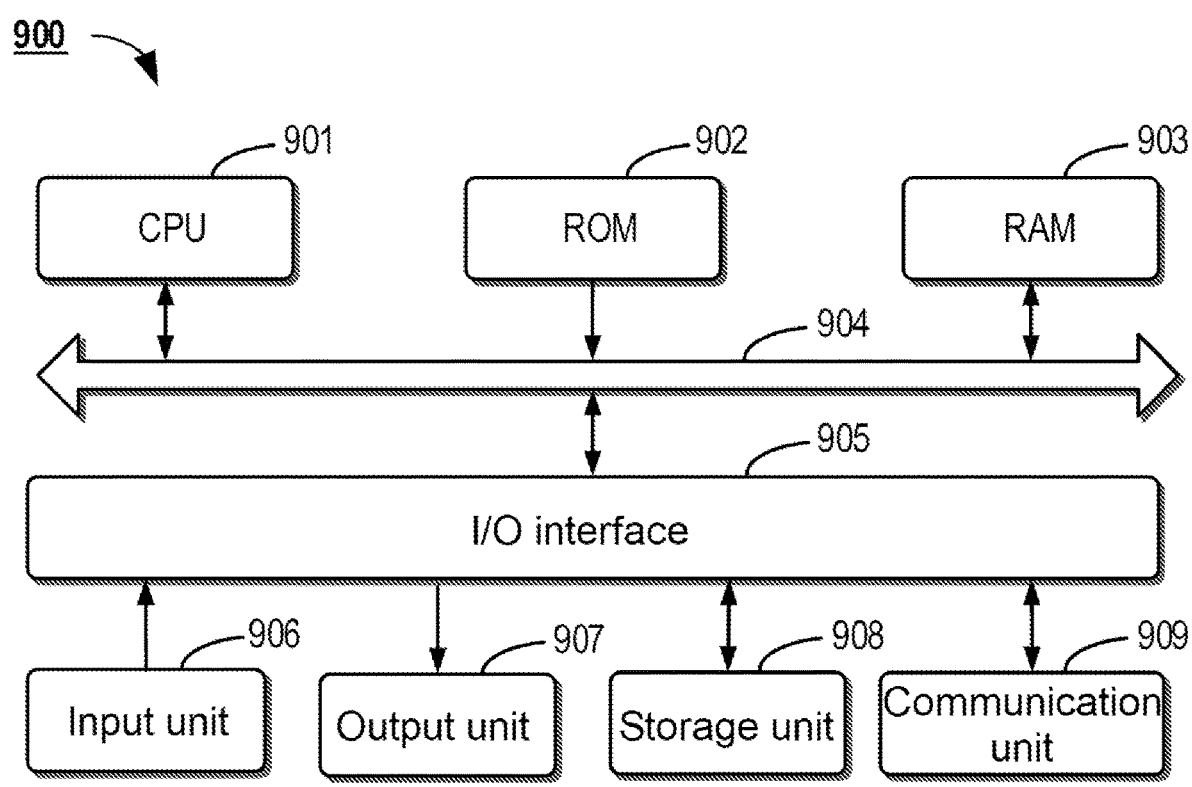
FIG. 9 illustrates a schematic structural diagram of a device that can be configured to implement embodiments of the present disclosure.

FIG. 9 illustrates a schematic structural diagram of example device 900 that can be configured to implement some embodiments of the present disclosure. Device 900 can be used to implement the aforementioned programmable switch and so on. As shown in FIG. 9, device 900 includes central processing unit (CPU) 901 that may perform various appropriate actions and processing according to computer program instructions stored in read-only memory (ROM) 902 or computer program instructions loaded from storage unit 908 into random access memory (RAM) 903. Various programs and data required for the operation of device 900 may also be stored in RAM 903. CPU 901, ROM 902, and RAM 903 are connected to each other through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network such as the Internet and/or various telecommunication networks.

CPU 901 may execute the various methods and/or processes described above, such as the method 200, the process of flow chart 400, and/or the process of flow chart 500. For example, in some embodiments, method 200 may be implemented as a computer software program that is tangibly included in a machine-readable medium, such as storage unit 908. In some embodiments, part or all of the computer program may be loaded and/or installed onto device 900 via ROM 902 and/or communication unit 909. When the computer program is loaded onto RAM 903 and executed by CPU 901, one or more steps of method 200 described above may be performed. Alternatively, in other embodiments, CPU 901 may be configured to perform method 200 and/or other processes disclosed herein in any other suitable manner (e.g., by means of firmware).

The functions described herein above may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the various embodiments disclosed herein.

What is claimed is:

1. A method, comprising:
    storing one or more mapping entries of domain names to Internet protocol (IP) addresses in a cache of a programmable switch, wherein the one or more mapping entries are obtained according to historical domain name system (DNS) responses from a DNS server;
    acquiring, by the programmable switch, a domain name in a DNS request received from a client;
    searching the cache of the programmable switch for an IP address corresponding to the domain name;
    generating, by the programmable switch according to the DNS request and the IP address corresponding to the domain name if the IP address is found, a DNS response that is to be sent to the client, wherein the DNS response comprises the IP address corresponding to the domain name that is found in the cache; and
    sending, by the programmable switch, the DNS response comprising the IP address to the client;
    wherein the programmable switch comprises an edge DNS server configured as a local resolving DNS server to perform initial processing of the DNS request received from the client, the local resolving DNS server being implemented utilizing a programmable resolver, a programmable match action pipeline, and a programmable inverse resolver of the programmable switch;
    wherein the programmable switch comprises a data plane and a control plane separate from the data plane, with the acquiring, searching, generating and sending being implemented in the data plane of the programmable switch, and the storing being implemented in the control plane of the programmable switch;
    wherein the programmable switch is configured to maintain in the data plane a rate counter for received DNS requests, the rate counter counting all of the received DNS requests without regard to differences in domain names corresponding to respective ones of the received DNS requests, and to discard a given received DNS request responsive to a current value of the rate counter being above a specified rate limit; and
    wherein the programmable switch is further configured to implement in the control plane a timer-driven cache deletion mechanism comprising respective timers for respective ones of the one or more mapping entries.

2. The method according to claim 1, wherein prior to said acquiring, by the programmable switch, a domain name in a DNS request received from a client, the method further comprises:
    receiving, by the programmable switch, a message from the client; and
    determining, by the programmable switch, that the message is the DNS request requiring the DNS response.

3. The method according to claim 2, wherein after said receiving, by the programmable switch, a message from the client, the method further comprises:
    determining, by the programmable switch, whether the message is a DNS message;
    forwarding the message by the programmable switch if the message is not the DNS message;
    determining, by the programmable switch if the message is the DNS message, whether the DNS message received reaches a predetermined rate; and
    discarding the DNS message by the programmable switch if it is determined that the DNS message received exceeds the predetermined rate.

4. The method according to claim 3, further comprising:
    confirming whether the client is valid by the programmable switch if it is determined that the DNS message received does not exceed the predetermined rate;
    discarding the DNS message by the programmable switch if it is confirmed that the client is invalid; and
    determining, by the programmable switch if it is confirmed that the client is valid, whether the DNS message is the DNS request requiring the DNS response.

5. The method according to claim 4, further comprising:
    acquiring, by the programmable switch if it is determined that the DNS message is a DNS response message, an indicated domain name and IP address from the DNS response message; and
    updating, by the programmable switch, a mapping entry of the indicated domain name to the IP address.

6. The method according to claim 1, wherein the DNS response is a first DNS response, and the method further comprises:
    performing proxy resolution of the domain name by the programmable switch if the IP address corresponding to the domain name is not found in the cache, so as to request the DNS server for the IP address;
    sending, by the programmable switch upon acquiring a second DNS response containing the IP address from the DNS server, the second DNS response comprising the IP address to the client; and
    storing, by the programmable switch, a mapping entry of the domain name to the IP address in the cache.

7. The method according to claim 1, wherein a time to live is set in a first mapping entry in the one or more mapping entries, and the method further comprises:

deleting, by the programmable switch, the first mapping entry in the cache when the time to live of the first mapping entry expires.

8. The method according to claim 1, further comprising: converting the DNS request by the programmable switch to a securely encrypted DNS request, wherein the securely encrypted DNS request comprises a DNS request based on Hypertext Transfer Protocol Secure (HTTPS) or a DNS request based on Transport Layer Security (TLS).

9. The method according to claim 1, wherein the programmable switch supports programming using a programming protocol-independent packet processors (P4) language.

10. A programmable switch, comprising:
a processor; and
a memory coupled to the processor, the memory having instructions stored therein, wherein the instructions, when executed by the processor, cause the programmable switch to perform operations comprising:
storing one or more mapping entries of domain names to Internet protocol (IP) addresses in a cache, wherein the one or more mapping entries are obtained according to historical domain name system (DNS) responses from a DNS server;
acquiring a domain name in a DNS request received from a client;
searching the cache for an IP address corresponding to the domain name;
generating, according to the DNS request and the IP address corresponding to the domain name if the IP address is found, a DNS response that is to be sent to the client, wherein the DNS response comprises the IP address corresponding to the domain name that is found in the cache; and
sending the DNS response comprising the IP address to the client;
wherein the programmable switch comprises an edge DNS server configured as a local resolving DNS server to perform initial processing of the DNS request received from the client, the local resolving DNS server being implemented utilizing a programmable resolver, a programmable match action pipeline, and a programmable inverse resolver of the programmable switch;
wherein the programmable switch comprises a data plane and a control plane separate from the data plane, with the acquiring, searching, generating and sending being implemented in the data plane of the programmable switch, and the storing being implemented in the control plane of the programmable switch;
wherein the programmable switch is configured to maintain in the data plane a rate counter for received DNS requests, the rate counter counting all of the received DNS requests without regard to differences in domain names corresponding to respective ones of the received DNS requests, and to discard a given received DNS request responsive to a current value of the rate counter being above a specified rate limit; and
wherein the programmable switch is further configured to implement in the control plane a timer-driven cache deletion mechanism comprising respective timers for respective ones of the one or more mapping entries.

11. The programmable switch according to claim 10, wherein prior to said acquiring a domain name in a DNS request received from a client, the operations further comprise:
receiving a message from the client; and
determining that the message is the DNS request requiring the DNS response.

12. The programmable switch according to claim 11, wherein after said receiving a message from the client, the operations further comprise:
determining whether the message is a DNS message;
forwarding the message if the message is not the DNS message;
determining, if the message is the DNS message, whether the DNS message received reaches a predetermined rate; and
discarding the DNS message if it is determined that the DNS message received exceeds the predetermined rate.

13. The programmable switch according to claim 12, wherein the operations further comprise:
confirming whether the client is valid if it is determined that the DNS message received does not exceed the predetermined rate;
discarding the DNS message if it is confirmed that the client is invalid; and
determining, if it is confirmed that the client is valid, whether the DNS message is the DNS request requiring the DNS response.

14. The programmable switch according to claim 13, wherein the operations further comprise:
acquiring, if it is determined that the DNS message is a DNS response message, an indicated domain name and IP address from the DNS response message; and
updating a mapping entry of the indicated domain name to the IP address.

15. The programmable switch according to claim 10, wherein the DNS response is a first DNS response, and the operations further comprise:
performing proxy resolution of the domain name if the IP address corresponding to the domain name is not found in the cache, so as to request the DNS server for the IP address;
sending, upon acquiring a second DNS response containing the IP address from the DNS server, the second DNS response comprising the IP address to the client; and
storing a mapping entry of the domain name to the IP address in the cache.

16. The programmable switch according to claim 10, wherein a time to live is set in a first mapping entry in the one or more mapping entries, and the operations further comprise:
deleting the first mapping entry in the cache when the time to live of the first mapping entry expires.

17. The programmable switch according to claim 10, wherein the operations further comprise:
converting the DNS request to a securely encrypted DNS request, wherein the securely encrypted DNS request comprises a DNS request based on Hypertext Transfer Protocol Secure (HTTPS) or a DNS request based on Transport Layer Security (TLS).

18. The programmable switch according to claim 10, wherein the programmable switch supports programming using a programming protocol-independent packet processors (P4) language.

19. A computer program product, the computer program product being tangibly stored on a non-transitory computer-readable medium and comprising machine-executable instructions, wherein the machine-executable instructions, when executed by a machine, cause the machine to perform the following:

storing one or more mapping entries of domain names to Internet protocol (IP) addresses in a cache of a programmable switch, wherein the one or more mapping entries are obtained according to historical domain name service (DNS) responses from a DNS server;

acquiring, by the programmable switch, a domain name in a DNS request received from a client;

searching the cache of the programmable switch for an IP address corresponding to the domain name;

generating, by the programmable switch according to the DNS request and the IP address corresponding to the domain name if the IP address is found, a DNS response that is to be sent to the client, wherein the DNS response comprises the IP address corresponding to the domain name that is found in the cache; and sending, by the programmable switch, the DNS response comprising the IP address to the client;

wherein the programmable switch comprises an edge DNS server configured as a local resolving DNS server to perform initial processing of the DNS request received from the client, the local resolving DNS server being implemented utilizing a programmable resolver, a programmable match action pipeline, and a programmable inverse resolver of the programmable switch;

wherein the programmable switch comprises a data plane and a control plane separate from the data plane, with the acquiring, searching, generating and sending being implemented in the data plane of the programmable switch, and the storing being implemented in the control plane of the programmable switch;

wherein the programmable switch is configured to maintain in the data plane a rate counter for received DNS requests, the rate counter counting all of the received DNS requests without regard to differences in domain names corresponding to respective ones of the received DNS requests, and to discard a given received DNS request responsive to a current value of the rate counter being above a specified rate limit; and wherein the programmable switch is further configured to implement in the control plane a timer-driven cache deletion mechanism comprising respective timers for respective ones of the one or more mapping entries.

20. The computer program product according to claim 19, wherein a time to live is set in a first mapping entry in the one or more mapping entries, and the machine-executable instructions, when executed, cause the machine to further perform the following:

deleting the first mapping entry in the cache when the time to live of the first mapping entry expires.

* * * * *